United States Patent [19]

Day

[11] 4,256,420

[45] Mar. 17, 1981

[54] NAIL HEAD DRILLING GUIDE

[76] Inventor: Claude Day, P.O. Box 431, Blakely, Ga. 31723

[21] Appl. No.: 4,994

[22] Filed: Jan. 22, 1979

[51] Int. Cl.³ ............................................. B23B 49/00
[52] U.S. Cl. ............................................. 408/115 R
[58] Field of Search ............... 408/115 R, 72 B, 72 R; 227/148, 150; 269/87.3, 294, 33; 145/46; 33/189

[56] References Cited

U.S. PATENT DOCUMENTS

| | | | |
|---|---|---|---|
| 2,733,517 | 2/1956 | Gjersoe | 33/189 |
| 2,889,633 | 6/1959 | Simon | 408/115 |
| 2,949,798 | 8/1960 | Berta, Jr. | 408/115 |
| 3,026,748 | 3/1962 | Comorau | 408/115 |
| 3,598,496 | 8/1971 | Skinner | 408/115 |

FOREIGN PATENT DOCUMENTS

| | | | |
|---|---|---|---|
| 674685 | 11/1963 | Canada | 145/46 |
| 105784 | 9/1899 | Fed. Rep. of Germany | 145/46 |
| 827926 | 1/1952 | Fed. Rep. of Germany | 145/46 |
| 594058 | 10/1947 | United Kingdom | 408/72 B |
| 1314809 | 4/1973 | United Kingdom | 408/115 |

*Primary Examiner*—William R. Briggs
*Attorney, Agent, or Firm*—Jones, Thomas & Askew

[57] ABSTRACT

A guide for locating and supporting a drill bit while drilling out the heads of nails which support rigid asbestos siding shingles. The guide is positioned by contact with an edge of a shingle. A number of drill guide holes is provided in the guide, and each hole has a countersunk portion of different diameter so as to accomodate different sizes of nail heads.

2 Claims, 3 Drawing Figures

NAIL HEAD DRILLING GUIDE

DESCRIPTION

Background of the Invention

This invention relates to a tool used during the process of removing asbestos shingles from roofs or walls. The tool is a drilling guide for aligning or stabilizing a drill bit while drilling out the heads of nails set in the asbestos shingles.

Asbestos shingles are made of hard, rock-like material and are often used as an outer surface for roofs or walls of buildings. The shingles are attached in overlapping fashion by nails driven through the shingles into the wooden structure of the building. When it becomes necessary or desirable to insulate the building, or otherwise service the walls of the building, the shingles must be temporarily removed. The common method of removing the shingles is to first drill out the heads of the nails and then pull the shingles off the headless nails. This is necessary because other methods, such as prying out the nails with a claw hammer or other tool, can result in breaking or otherwise damaging the relatively brittle shingles. Also, the nail heads are often flush with the surface of the shingle and are difficult to approach. The shingles themselves are expensive and also difficult to replace with matching new shingles; therefore, it is important that the shingles be removed with as little damage as possible in order that they may be replaced and reused.

It is known to remove nailed shingles by drilling out the nail heads, after which the shingle can be removed from the remaining shank of the nails. Once a shingle is thus removed, the nails can be easily extracted from the subsurface material. When drilling out the heads of the nails, however, it is often difficult to hold the drill and the drill bit in good contact and proper alignment with the nail head. Because the nail head is flat and hard, particularly the finish nails typically used with asbestos siding, the drill bit has a tendency to skip off the nail head during the drilling operation and sometimes results in chipping or scratching the shingles.

SUMMARY OF THE INVENTION

Briefly described, the present invention is a drilling guide for aligning and stabilizing the drill bit during a drilling operation. The drilling guide is alignable with a portion of a shingle or other workpiece to assist in locating the guide before and during a drilling operation. Stated somewhat more specifically, the drilling guide comprises a base plate having a forward edge which abuts against one edge of an asbestos shingle, a drill-bit guide plate which rests on top of the base plate, and a handle which attaches to the first two elements through the outer end of the guide plate. Each guide passage receives a drill bit therethrough, and the undersides of the guide passages are formed with countersunk bores for accomodating nail heads. The countersunk bores are of different diameters so as to receive nail heads of different sizes.

With the base plate abutting tightly against the edge of a shingle, one of the guide passages can be adjustably positioned over a nail head to be in alignment with the nail head. The guide can be held in position by using the handle. The drill bit is extended through the appropriate guide passage and the drilling begun. The drill bit is confined to the guide passage and cannot fly off the nail head so long as the guide is held firmly.

Therefore, it is an object of the present invention to provide a drilling guide which is easily maneuvered and handled by a workman who is simultaneously operating a drill.

Another object of the present invention is to provide a drilling guide which can be operated accurately in conjunction with overlapping shingles for aligning and stabilizing a drill bit used to drill out the heads of nails driven through the shingles.

Other objects, features and advantages of the present invention will become apparent upon reading the following specification, when taken in conjunction with the accompanying drawing.

DETAILED DESCRIPTION

Figure 1:
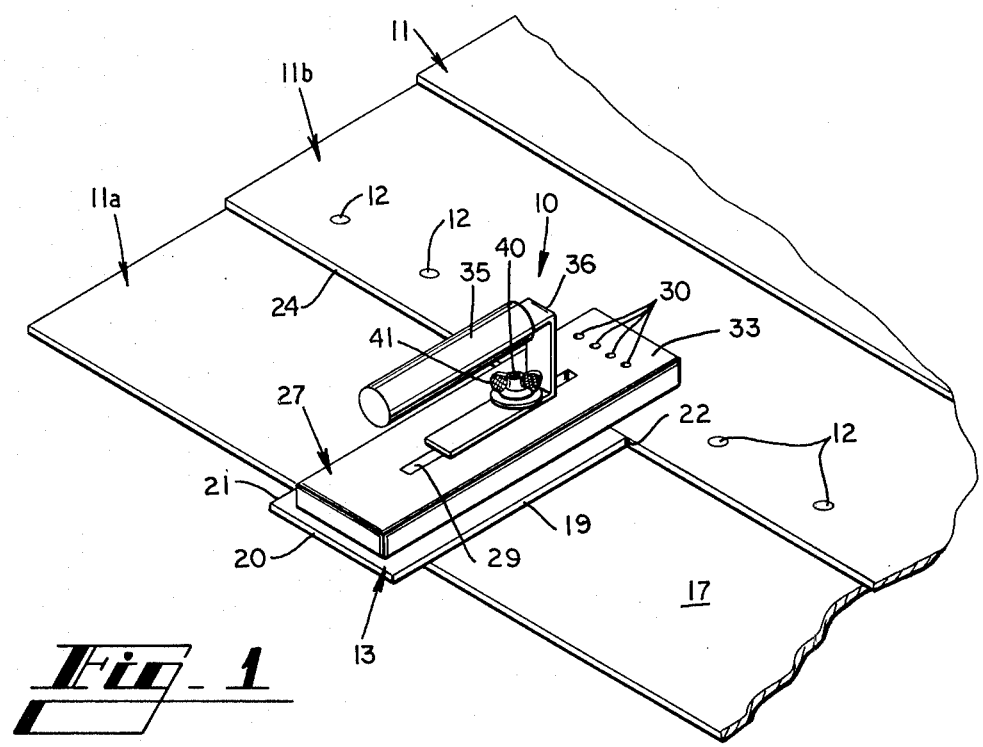
FIG. 1 is a pictorial view of an embodiment of the drilling guide of the present invention in position on an asbestos shingle.

Referring now in more detail to the drawings in which like numerals represent like components throughout the several views, FIG. 1 shows the drilling guide indicated generally at 10 positioned for use on a series of overlapping shingles 11a, 11b, 11c, such as asbestos shingles. The shingles 11 are nailed in place by nails (not seen) of which the nail heads 12, shown somewhat enlarged in FIG. 1 for illustrative purpose, are visible.

Figure 3:
FIG. 3 is a bottom view of the drilling guide shown in FIG. 1.

The drilling guide 10 of the disclosed embodiment comprises a base plate 13 having a flat bottom 14 (see FIG. 3) for resting against the outer surface 17 of a first asbestos shingle 11a. The hose plate 13 is rectangular having four straight edges 19, 20, 21, 22 extending perpendicular to the flat bottom 14. The four straight edges include a forward edge 22 for abutting against the edge 24 of a second shingle 11b which overlaps the first shingle 11a.

A rectangular drill bit guide plate 27 is removably positioned on top of the base plate 13. An elongated channel 29 is formed lengthwise through the center of the guide plate 27. A number of drill bit guide passages 30 are formed in one of the guide plate 27 extending perpendicular to the plane of the guide plate 27 and base plate 13. Each drill bit guide passage 30 comprises an upper small diameter portion 31 adjacent the upper surface 33 of the guide plate 27 and a lower large diameter portion 32 (see FIG. 3) adjacent the lower surface 34 of the guide plate 27. The lower large diameter portion 32 are countersunk bores 5 which are concentric with the drill bit guide passage 30. In the preferred embodiment, the upper portions 31 of all passages 30 are of equal diameter to loosely accomodate a drill bit of desired diameter, and the lower portions 32 are of different diameters to accomodate nail heads of several different diameters.

A handle 35 is attached to a handle bracket 36 which is removeably positioned above the drill bit guide plate 27. A bolt 40 extends upwardly from the base plate 13 through the elongated channel 29 of the guide plate 27 and through a hole 37 in the handle bracket. A wing nut 41 is threaded on the end of the bolt 40. The bolt 40 extends through an opening 43 in the base plate 13, and the head 42 of the bolt 40 is countersunk into the bottom 14 of the base plate 13 in order that the bolt head 42 is flush with the flat bottom 14 of the base plate. The bolt 40 could be permanently welded or otherwise attached to the base plate 13.

Figure 2:
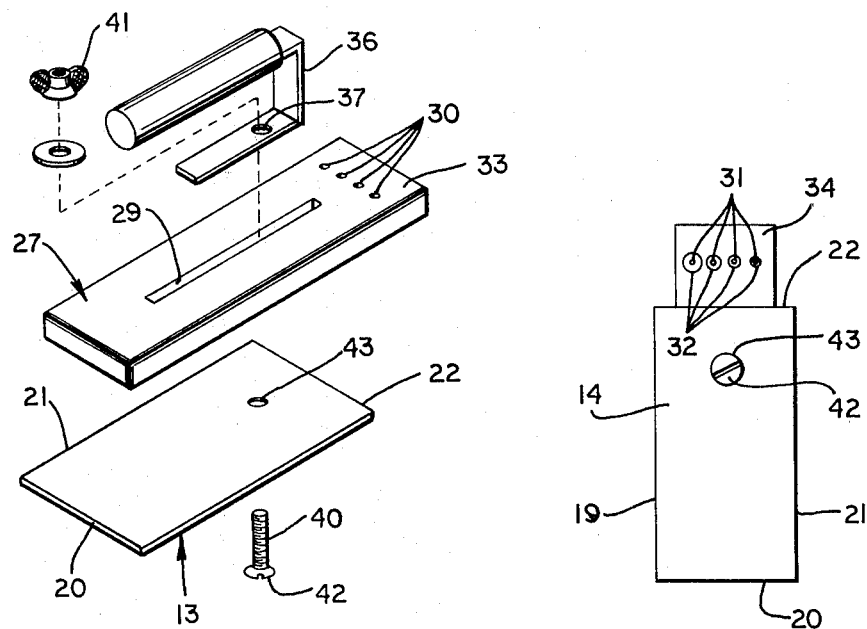
FIG. 2 is an exploded pictorial view of the drilling guide shown in FIG. 1.

In operation, the base plate 13, drill-bit guide plate 27, and handle bracket 36 with the attached handle 35 are assembled and held together, one on top of the other, by the bolt 40 and wing nut 41 as shown in FIGS. 1 and 2. While holding onto the handle 35, the user places the assembled drilling guide 10 on the asbestos shingles 11 with the base plate 13 resting on a first shingle 11a and the forward edge 22 of the base plate abutting against the edge 24 of a second overlapping shingle 11b. The wing nut 41 is loosened slightly to allow the drill bit guide plate 27 to slide freely between the base plate 13 and the handle bracket 36. The guide plate 27 slides in any direction radially outward from the bolt 40 and the distance along which the guide plate 27 can be removed is limited by the length of the elongated channel 29 which encircles the bolt 40. By moving the assembled drilling guide 10 along the edge 24 of the second shingle 11b, and sliding the drill-bit guide plate 27 inwardly and outwardly beyond the forward edge 22 of the base plate 13, an appropriate drill-bit guide passage 30 can be located in axial alignment over a nail head 12 on the second shingle 11b. The lower large diameter portions or countersunk bores 32 of the guide passages 30 are of different diameters in order to receive nail heads 12 of different sizes. If a nail head 12 is protruding slightly above the surface of the shingle 11b, a guide passage 30, with a lower portion 32 of diameter large enough to accept the nail head 12 therein, can be selected to align with the nail head 12 in order that the drill bit guide plate 27 will rest flush against the surface of the second shingle 11b with the nail head 12 protruding into the countersunk bore 32.

Once the guide plate 27 has been extended its proper amount, the wing nut 41 is tightened down on the bolt 40 to hold the drill bit guide plate 27 immoveable relative to the base plate 13 and handle 35. With the guide passage 30 positioned over the nail head 12 as described above, the user extends a drill bit through the guide passage and drills out the nail head 12. With the drilling guide 10 held in one hand and the drill (not shown), with its drill bit extending through the guide passage 30, held in the other hand, the user can successively drill out the nail heads 12 without fear of the drill bit jumping or being deflected about and damaging the shingle.

While this invention has been described with particular reference to a preferred embodiment thereof, it will be understood that variations and modifications can be effected within the spirit and scope of the invention as described hereinbefore and as defined in the appended claims.

I claim:

1. A drilling guide for aligning and stabilizing a drill bit while drilling out the heads of nails set in asbestos shingles, said drilling guide comprising:

a base plate including a forward edge for abutting against an edge of a shingle;

drill bit guide means positioned above said base plate and adjustably extendable beyond said forward edge of said base plate and over the asbestos shingle, said drill bit guide means comprising a guide plate and a plurality of guide holes through which a drill bit is to be extended to engage a nail head set in the shingle, said guide holes being defined in said guide plate in alignment with said forward edge of said base plate;

each of said plural guide holes having the same diameter;

a countersunk portion surrounding each of said guide holes in confronting relation to the nail head being drilled, each of said countersunk portions being of mutually different diameter so as to accomodate nail heads of correspondingly different sizes; and means for releasably securing said guide means to said base plate, whereby said guide plate is adjustable relative to said base plate and said base plate is moveable along the edge of the asbestos shingle to position said guide hole in axial alignment with a nail head.

2. A drilling guide as in claim 1, further comprising a handle means associated with said drilling guide for holding and maneuvering said drilling guide along the shingle.

* * * * *